United States Patent [19]

Moriyama et al.

[11] Patent Number: 5,537,409
[45] Date of Patent: Jul. 16, 1996

[54] SYNCHRONIZING SYSTEM FOR TIME-DIVIDED VIDEO AND AUDIO SIGNALS

[75] Inventors: Yoshiaki Moriyama; Kouichi Ono, both of Tsurugashima; Sumio Hosaka; Takao Yamada, both of Tokorozawa, all of Japan

[73] Assignee: Pioneer Electronic Corporation, Tokyo, Japan

[21] Appl. No.: 257,105

[22] Filed: Jun. 8, 1994

[30] Foreign Application Priority Data

Jul. 16, 1993 [JP] Japan .................................. 5-176695

[51] Int. Cl.$^6$ ..................................................... H04N 7/52
[52] U.S. Cl. .......................... 370/84; 370/94.2; 370/105.1; 370/105.4; 370/112; 348/423
[58] Field of Search ................................. 370/94.2, 100.1, 370/105.1, 105.4, 105.5, 112, 84; 352/1, 5, 12, 15–17, 23; 348/17, 423, 466, 467

[56] References Cited

U.S. PATENT DOCUMENTS

| 3,898,376 | 8/1975 | Nabeyama et al. | 370/100.1 X |
| 4,688,246 | 8/1987 | Eilers et al. | 375/110 X |
| 5,111,292 | 5/1992 | Kuriacose et al. | 370/110.1 X |
| 5,262,964 | 11/1993 | Bonsall et al. | 370/94.2 X |

Primary Examiner—Douglas W. Olms
Assistant Examiner—Russell W. Blum
Attorney, Agent, or Firm—Sughrue, Mion, Zinn, Macpeak & Seas

[57] ABSTRACT

A synchronizing system with a simple structure accomplishes synchronous reproduction without complicating a control circuit for synchronizing video and audio signals with each other. The number of unit audio data blocks to be put in one pack is set in such a way that the difference between the presentation start times for the stream of video data and the stream of audio data in one pack in a predetermined pack period becomes a predetermined value, and the pack carries positional information of the pack in the predetermined pack period to the pack. In a reproducing apparatus, the difference between presentation start times for video signals and audio signals in each pack is acquired by referring to positional information (AAU sequence number) in a stream of packs, transferred by the above transmission method, and at least one of the presentation start times for video signals and audio signals in the stream of packs is controlled so that the difference between the presentation start times coincides with the difference between the presentation start times corresponding to the positional information.

10 Claims, 10 Drawing Sheets

FIG.9

| PACK NO. | 1 | 2 | 3 | 4 | 5 | 6 | 7 | 8 | 9 | 10 |
|---|---|---|---|---|---|---|---|---|---|---|
| AAU SEQUENCE NO. | 0 | 1 | 2 | 3 | 4 | 5 | 6 | 7 | 8 | 9 |
| NUMBER OF AAUs | 21 | 21 | 21 | 21 | 21 | 21 | 20 | 21 | 21 | 21 |
| TIME DIFFERENCE (msec.) | 0 | 3.5 | 7.0 | 10.5 | 14.0 | 17.5 | 21.0 | 0.5 | 4.0 | 7.5 |

| PACK NO. | 11 | 12 | 13 | 14 | 15 | 16 | 17 | 18 | 19 | 20 |
|---|---|---|---|---|---|---|---|---|---|---|
| AAU SEQUENCE NO. | 10 | 11 | 12 | 13 | 14 | 15 | 16 | 17 | 18 | 19 |
| NUMBER OF AAUs | 21 | 21 | 21 | 20 | 21 | 21 | 21 | 21 | 21 | 21 |
| TIME DIFFERENCE (msec.) | 11.0 | 14.5 | 18.0 | 21.5 | 1.0 | 4.5 | 8.0 | 11.5 | 15.0 | 18.5 |

| PACK NO. | 21 | 22 | 23 | 24 | 25 | 26 | 27 | 28 | 29 | 30 |
|---|---|---|---|---|---|---|---|---|---|---|
| AAU SEQUENCE NO. | 20 | 21 | 22 | 23 | 24 | 25 | 26 | 27 | 28 | 29 |
| NUMBER OF AAUs | 20 | 21 | 21 | 21 | 21 | 21 | 21 | 20 | 21 | 21 |
| TIME DIFFERENCE (msec.) | 22.0 | 1.5 | 5.0 | 8.5 | 12.0 | 15.5 | 19.0 | 22.5 | 2.0 | 5.5 |

| PACK NO. | 31 | 32 | 33 | 34 | 35 | 36 | 37 | 38 | 39 | 40 |
|---|---|---|---|---|---|---|---|---|---|---|
| AAU SEQUENCE NO. | 30 | 31 | 32 | 33 | 34 | 35 | 36 | 37 | 38 | 39 |
| NUMBER OF AAUs | 21 | 21 | 21 | 21 | 20 | 21 | 21 | 21 | 21 | 21 |
| TIME DIFFERENCE (msec.) | 9.0 | 12.5 | 16.0 | 19.5 | 23.0 | 2.5 | 6.0 | 9.5 | 13.0 | 16.5 |

←——— 48-PACK PERIOD ———→|←— NEXT 48-PACK PERIOD

| PACK NO. | 41 | 42 | 43 | 44 | 45 | 46 | 47 | 48 | 49 | 50 |
|---|---|---|---|---|---|---|---|---|---|---|
| AAU SEQUENCE NO. | 40 | 41 | 42 | 43 | 44 | 45 | 46 | 47 | 0 | 1 |
| NUMBER OF AAUs | 21 | 20 | 21 | 21 | 21 | 21 | 21 | 20 | 21 | 21 |
| TIME DIFFERENCE (msec.) | 20.0 | 23.5 | 3.0 | 6.5 | 10.0 | 13.5 | 17.0 | 20.5 | 0 | 3.5 |

. . . .

SYNCHRONIZING SYSTEM FOR TIME-DIVIDED VIDEO AND AUDIO SIGNALS

BACKGROUND OF THE INVENTION

1. Field of the Invention

The present invention relates to a synchronizing system which reproduces a video signal and an audio signal synchronously in a system that transfers coded video and audio signals in time-division multiplexing.

2. Description of Background Information

As a method of recording, reproducing or transferring compressed and coded video and audio signals and other data in time-division multiplexing, there is MPEG (Motion Picture coding Experts Group) which conforms to ISO 11172.

The compressive coding of video signals in this scheme employs predictive coding in combination with motion compensation, and discrete cosine transformation (DCT).

The method described in the ISO 11172 states that a counter having many bits should be provided in the reproducing apparatus. Also the method states that decoding timing should be controlled so as to start the presentation of decoded data as a video image or voices and sound when the value of the counter coincides with the presentation time stamp (PTS). Consequently the control circuit therefore becomes complicated.

SUMMARY OF THE INVENTION

It is therefore an object of the present invention to provide a synchronizing system with a simple structure, which can accomplish synchronous reproduction without complicating a control circuit for synchronizing video and audio signals with each other.

To achieve the above object, according to one aspect of this invention, there is provided a method of transmitting time-divided video and audio signals, comprising the steps of coding a predetermined time slot of video signals to form a stream of video data; coding a predetermined number of samples of audio signals to form a unit audio data block and forming a stream of audio data consisting of unit audio data blocks whose quantity approximately corresponds to the predetermined time slot; performing time-division multiplexing on the stream of video data and the stream of audio data, storing resultant data in a pack having the predetermined time slot, and transferring video signals and audio signals in a stream of packs; and setting the quantity in such a way that a difference between presentation start times for the stream of video data and the stream of audio data in one pack in a predetermined pack period becomes a predetermined value, and affixing positional information of the pack in the predetermined pack period to the pack.

According to another aspect of this invention, there is provided a method of reproducing time-divided video and audio signals, comprising a step of referring to positional information from a stream of packs, transferred by the above transmission method, to control at least one of presentation start times for video signals and audio signals in the stream of packs in such a manner that a difference between the presentation start times for the video signals and audio signals coincides with a difference between presentation start times corresponding to the positional information.

According to the method of transmitting time-divided video and audio signals, the number of unit audio data blocks to be put in one pack is set in such a way that the difference between the presentation start times for the stream of video data and the stream of audio data in one pack in a predetermined pack period becomes a predetermined value, and the pack carries positional information of the pack in the predetermined pack period to the pack.

According to the method of reproducing time-divided video and audio signals, the difference between presentation start times for video signals and audio signals in each pack is acquired by referring to positional information in a stream of packs, transferred by the above transmission method, and at least one of the presentation start times for video signals and audio signals in the stream of packs is controlled so that the difference between the presentation start times coincides with the difference between the presentation start times corresponding to the positional information.

BRIEF DESCRIPTION OF THE DRAWINGS

FIG. 9 is a diagram showing the relation among an AAU (Audio Access Unit) sequence number, the number of AAUs in one pack, and the difference between presentation start times for video signals and audio signals in a reproducing apparatus.

DETAILED DESCRIPTION OF THE PREFERRED EMBODIMENTS

Before discussing a preferred embodiment of the present invention, the conventional compressive coding method will be described referring to the accompanying drawings.

An image coded by the MPEG scheme consists of an I picture (Intra coded picture) coded within a frame, a P picture (predictive coded picture) obtained by coding the difference between the current image and an old picture (decoded image of an I or P picture) and a B picture (Bidirectionally predictive coded picture) obtained by coding the difference between the current image and an interpolated image which is predicted bidirectionally from old and future images. The predictive directions are illustrated in FIG. 1.

Figure 1:
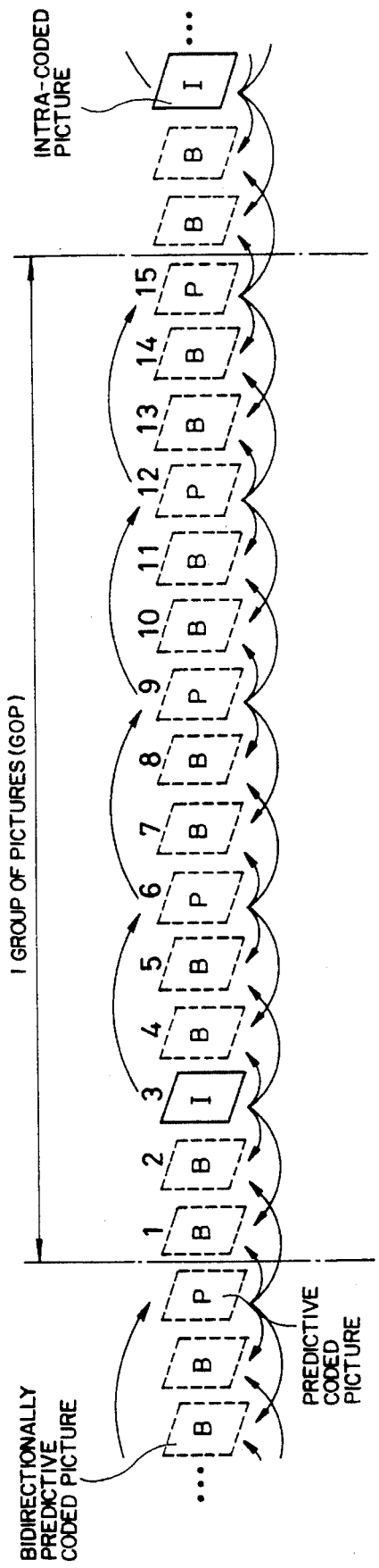
FIG. 1 is a diagram showing the directions of prediction between frames of video signals in the compressive coding which conforms to ISO 11172.

Referring to FIG. 1, coded frame images are symbolized as parallelograms frame by frame. Those frame images correspond to consecutive frames of input video signals, and "I", "P" and "B" affixed to the frame images indicate the aforementioned types of pictures of the frame images. The arrowheads indicate the directions of prediction between frames.

A certain video sequence unit is collectively called "GOP" (Group Of Pictures). As one example, 15 frames are treated as A GOP in FIG. 1 and are sequentially given frame numbers.

The compression efficiency in this coding varies with the difference in the coding scheme of the individual picture types. The compression efficiency is the highest for B pictures, the next highest compression efficiency for P pictures and the lowest compression efficiency for I pictures. After compression, therefore, the I picture has the largest amount of data, the P picture has the next largest amount of data, and the B picture has the smallest amount of data. The amounts of data of each frame and each GOP are not be constant and differ depending on video information to be transmitted.

Figure 2:
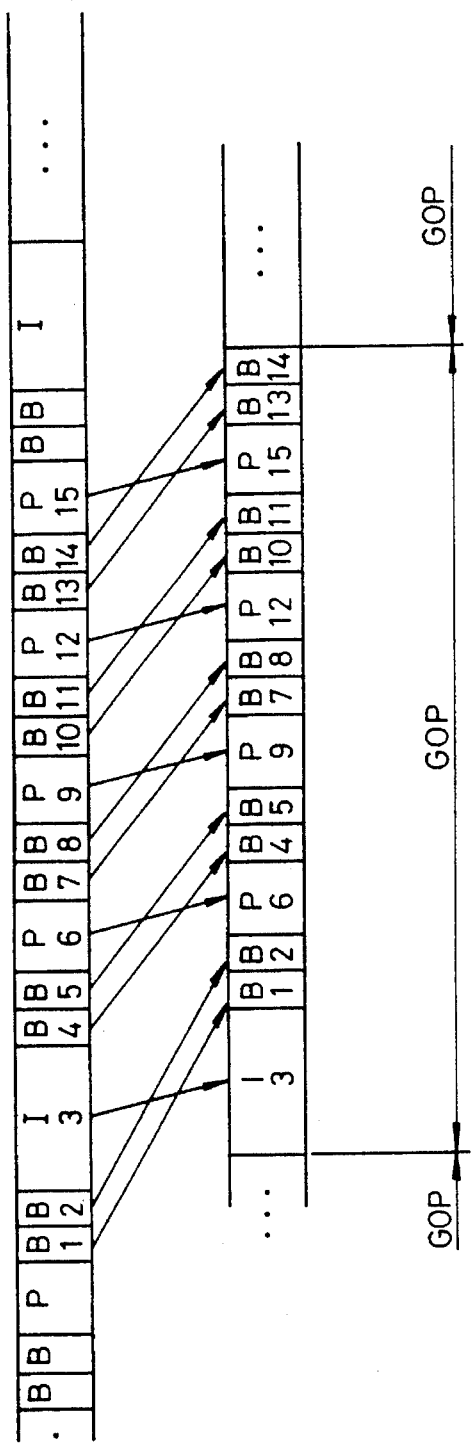
FIG. 2 is a diagram showing the transmission state of a video stream which conforms to ISO 11172.

While the order of uncompressed frames are as shown in FIG. 1, the order of compressed frames at the time of transmission becomes as shown in FIG. 2 for the purpose of reducing the delay time in the decoding process.

Portions (a) and (b) in FIG. 2 conceptually illustrate each coded frame image in view of the amount of data after compression. The picture types I, P and B and frame numbers correspond to those shown in FIG. 1. The coded video signals are arranged in the order of frame numbers as illustrated, and a sequence header SQH can be affixed to ensure independent reproduction GOP by GOP as shown in a portion (c) in FIG. 2. The sequence header SQH, which is located at least at the head of a stream of data or a video stream as shown in the portion (b) in FIG. 2, describes information about the entire video stream. The sequence header SQH may be affixed to the head of every GOP to ensure reproduction of data from a middle part of each GOP. Also, the sequence header SQH may include initial data needed for the decoding process, such as the size of an image and the ratio of the vertical pixels to the horizontal pixels. A video stream to be transferred to a decoder is formed in the above manner.

The system part of the MPEG further specifies a scheme of multiplexing a compressed audio stream and a stream of other data in addition to the aforementioned compressed video stream and accomplishing the synchronized reproduction of those streams.

Figure 3:
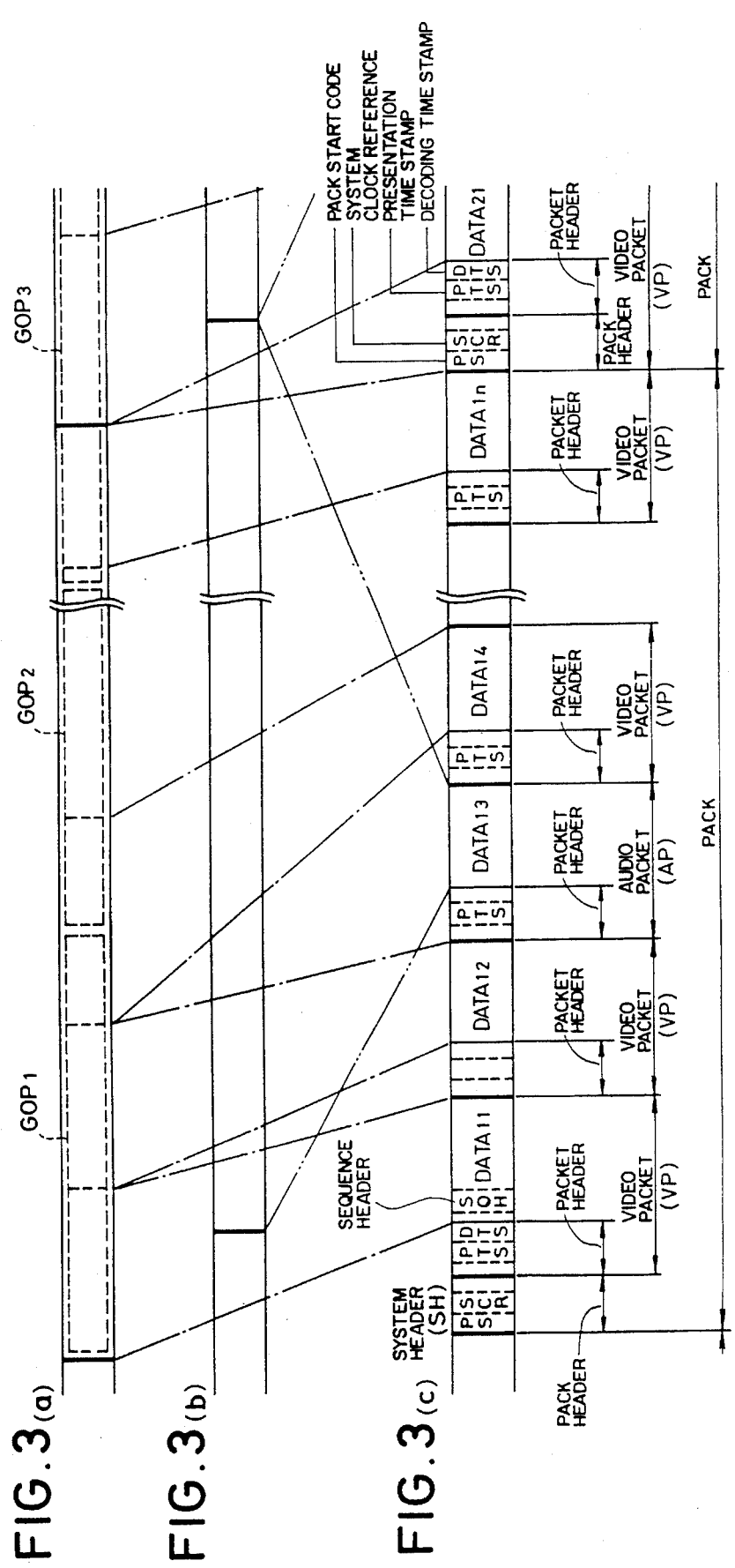
FIG. 3 is a diagram exemplifying the multiplexing of various kinds of data that is specified by the system part of MPEG which conforms to ISO 11172.

FIG. 3 exemplifies the multiplexing of various kinds of data, which is specified by the system part of the MPEG.

In FIG. 3, a portion (a) indicates a data stream of coded video signals consecutively arranged in the order of GOPs as indicated by the portion (c) in FIG. 2, a video stream and a portion (b) indicates a data stream of audio signals that are compressed and coded by a predetermined coding scheme which will not be discussed in detail. Partial data of each stream is stored in a packet together with a packet header located at the head of the packet. A packet in which video stream data is stored is called a video packet (VP), and a packet in which audio stream data is stored is called an audio packet (AP). Likewise, a packet in which a stream of data other than video and audio signals, such as control data, is stored is called a data packet (DP) though not illustrated.

Some of those packets are grouped as a pack with a pack header placed at the head of this pack. The packets are transmitted pack by pack in the form shown in a portion (c) in FIG. 3. In the packet transmission, the pack header serves as a system header (SH) which describes information about the whole pack stream and includes a pack start code PS and a system clock reference SCR that indicates the reference of time. The packet header includes a presentation time stamp PTS and a decoding time stamp DTS as needed. A pack is the collection of individual partial streams each corresponding to a packet.

SCR in the pack header is the number of system clocks of 90 KHz counted from some point of time, and is used as a reference of time in reproducing the associated pack. PTS in the packet header represents the time at which the presentation of the packet containing that PTS as a video image or sound and voices starts, by the number of the system clocks counted. DTS represents the time at which decoding of the packet containing that DTS starts. For B pictures in a video packet and an audio packet, the time data of PTS equals that of DTS so that DTS need not particularly be described. For I and P pictures in a video packet, since the presentation starting time lags from the decoding starting time due to the rearrangement of the frames in the opposite order to the one shown in FIG. 2, PTS and DTS should be inserted as needed. PTS or a combination of PTS and DTS is inserted in a stream of video and audio packets at an interval of 0.7 sec or below.

In reproducing such a stream of packs, the value of SCR is loaded into a counter in a reproducing apparatus and thereafter the counter starts counting and is used as a clock. When the PTS or DTS is present, each packet is decoded at the timing at which the presentation of the packet as a video image or sound and voices starts when the value of the counter coincides with the PTS. With no PTS and DTS present, each packet is decoded according to the decoding of the previous packet of the same kind.

Figure 4:
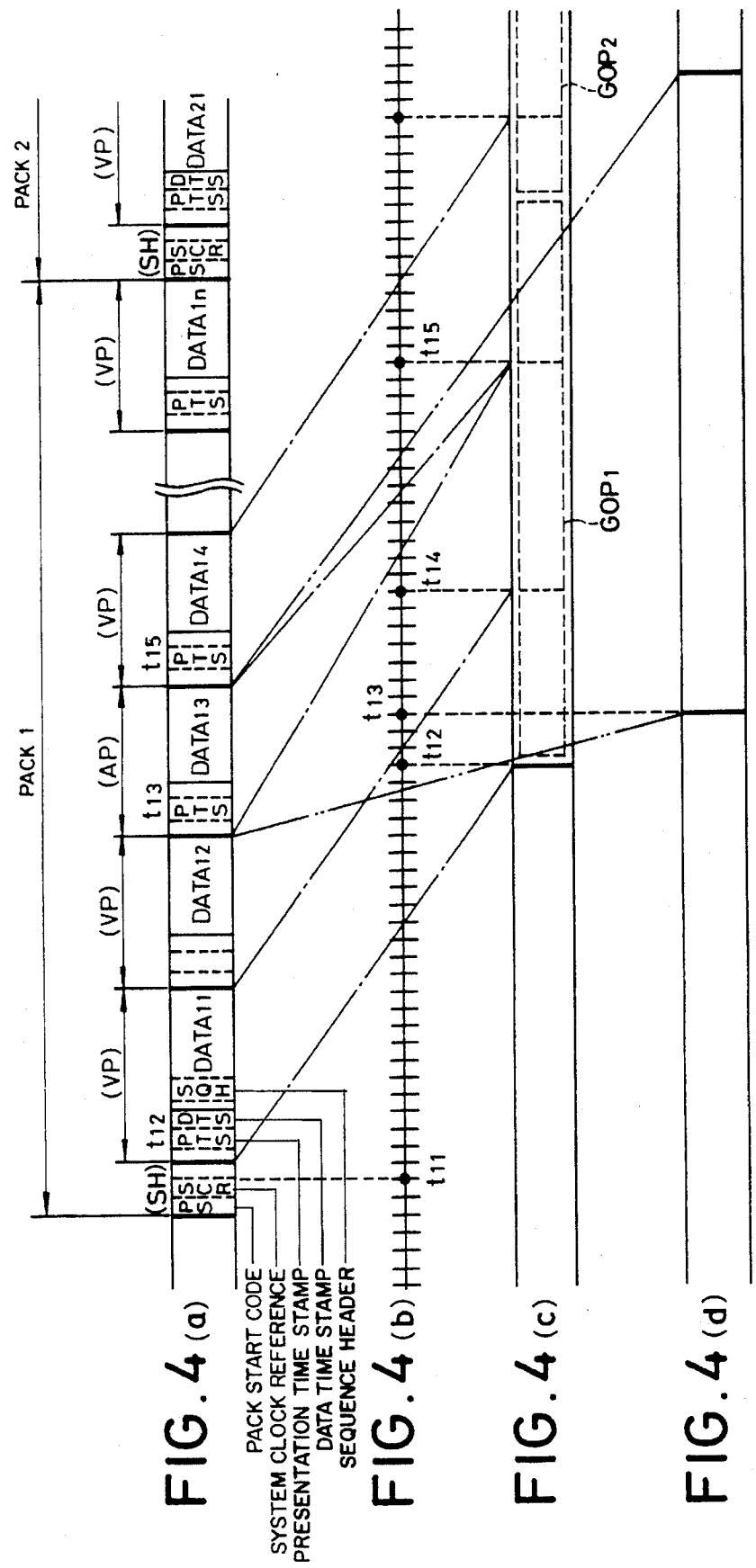
FIG. 4 is a diagram for explaining various time stamps and reference time information, showing how a stream of multiplexed packs in FIG. 3 are reproduced.

The above will be conceptually explained below. FIG. 4 illustrates the reproduction state of the stream of packs that are denoted by the same shapes and reference numerals as used in FIG. 3. Suppose that SCR of a pack 1 has been input at time t11 based on the system clock indicated in a portion (b) in FIG. 4. Time data t11 is described in the SCR. Since video stream data whose presentation starts from time t12 is stored in data DATA11 in the first packet in the pack 1, the corresponding time data t12 is described in PTS of that packet. Since audio stream data whose presentation starts from time t13 is stored in data DATA13 in the third packet in the pack 1, the corresponding time data t13 is described in PTS of that packet. Also, since the end portion of GOP1 whose presentation starts from time t15 and the head portion of subsequent GOP2 are stored in data DATA14 in the fourth packet in the pack 1, the corresponding time data t15 is described in PTS of that packet. For the subsequent packs and packets, SCR and PTS are described in the same manner. A portion (c) in FIG. 4 shows presented video signals and a portion (d) shows presented audio signals. Although no PTS is described in the header of that packet which stores packet data DATA12, such a description is unnecessary as long as PTS is inserted at the aforementioned interval of 0.7 sec or below. Assuming that a GOP has the structure shown in FIG. 2, then the packet data DATA11 contains the data of the first I picture of the GOP. Thus, a value described in DTS in the packet header of the DATA11 is equivalent to the time stored in the PTS minus the length of time of the previous three frames.

As mentioned earlier, the method described in the ISO 11172 has shortcomings such that a counter having many bits should be provided in the reproducing apparatus, and that decoding timing should be so controlled as to start the presentation of decoded data as a video image or sound and voices when the value of the counter coincides with the presentation time stamp (PTS). Also, as previously mentioned, this method complicates the control circuit.

The present invention will now be described in detail referring to the accompanying drawings.

First, the length of one pack is set equal to the time slot for one GOP (e.g., 15 frames) of video signals, which are stored in a compressed form in video packets in one pack.

This is accomplished by the following method.

Figure 5:
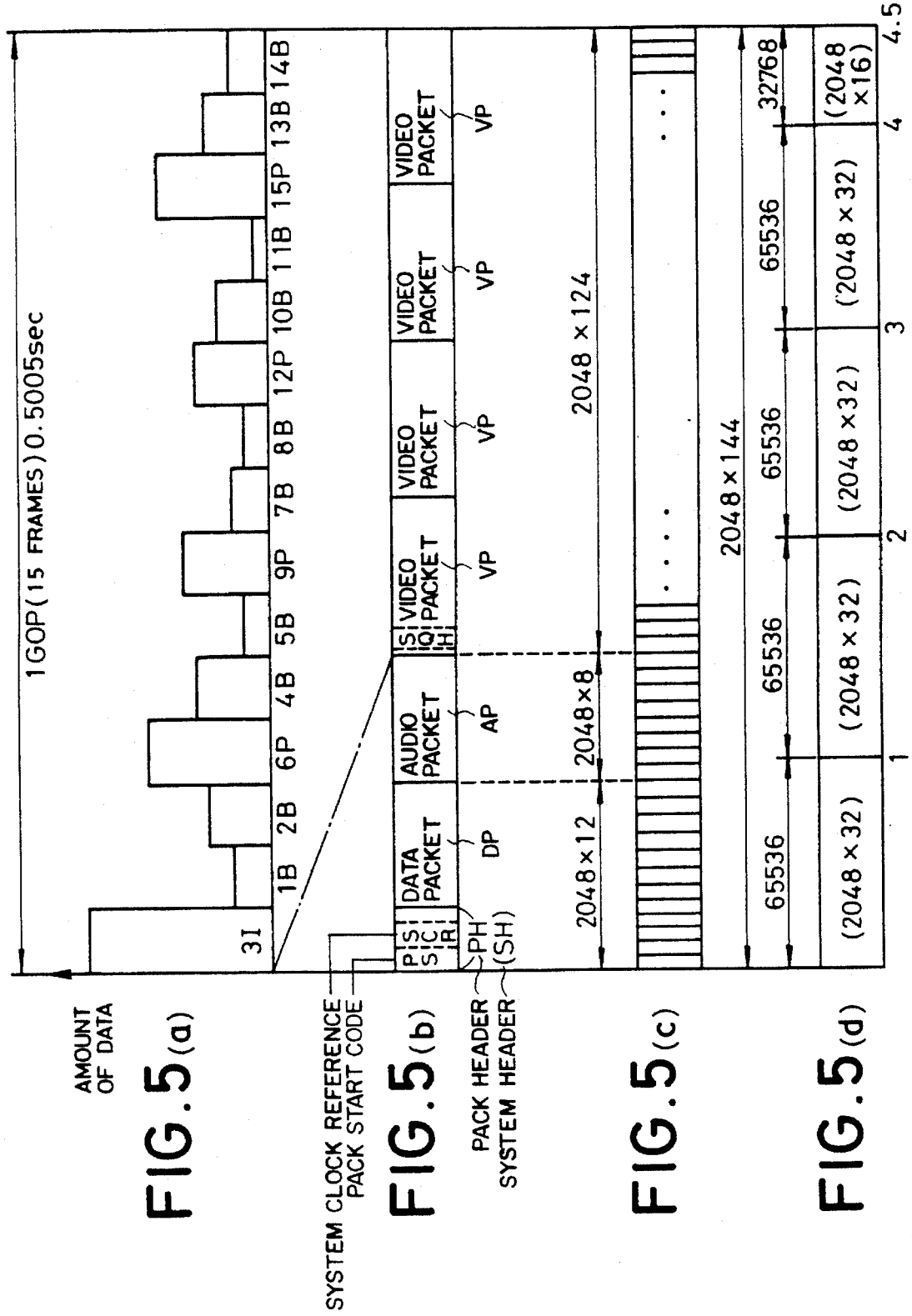
FIG. 5 is a diagram showing a data format in a method of recording compressed and coded data.

FIG. 5 is a diagram showing a data format in a method of recording compressed and coded data according to such a method.

In FIG. 5, the amount of data of video signals after compression as shown in (b) in FIG. 2 differs frame by frame but should always be constant in one GOP. A scheme for making the amount of data in a single GOP constant will be discussed later. A portion (a) in FIG. 5 shows the amount of data for each frame in a GOP, with the vertical scale representing the amount of data and the horizontal scale representing frames 3I to 14B. The data of the GOP is stored as a video packet VP in a pack together with an audio packet AP and a data packet DP as indicated in a portion (b) in FIG. 5. The size of one logical block (portion (c) in FIG. 5) of a predetermined recording medium on which such packets are recorded is 2048 bytes, and one pack has a size of 2048×144 bytes (144 logical blocks). In one pack, the system header SH including the pack start code PS and system clock reference SCR, and a data packet DP occupy 2048×12 bytes, an audio packet AP occupies 2048×8 bytes and four video packets VP occupy 2048×124 bytes.

The upper limit of the bit rate for audio and video signals after compression become as follows.

audio: 2048×8×8/0.5005=261.88 (Kbps)

video: 2048×124×8/0.5005=4.059 (Mbps)

The above bit rates are sufficient to transmit two channels of high-quality audio signals and video signals having a high image quality. To provide four channels of audio signals, the size of the data packet DP should be changed to 2048×4 bytes and another audio packet of 2048×8 bytes should be added so that each pack contains two systems of audio signals.

The number of physical blocks (portion (d) in FIG. 5) of the predetermined recording medium varies depending on the error correcting system, particularly, the property of a burst error and the size of redundancy allowed by the error correction code in the recording and reproducing system for the recording medium. For instance, when one physical block has a size of $2^{16}=65536$ bytes, one pack has four and half physical blocks, and when one physical block has a size of $2^{15}=32768$ bytes, one pack has nine physical blocks.

As the audio packet AP contains compressed audio signals which should be reproduced at substantially the same time as the GOP, decoding the audio signals and reproducing them in synchronism with the video signals require a buffer memory which has a capacity to store at least one packet of audio signals plus audio signals for the decoding delay of video signals. Because the audio signals carry a small amount of data, however, the buffer memory can have a small capacity.

The following exemplifies a method of making the amount of data in a video stream constant in one GOP as mentioned above.

Figure 6:
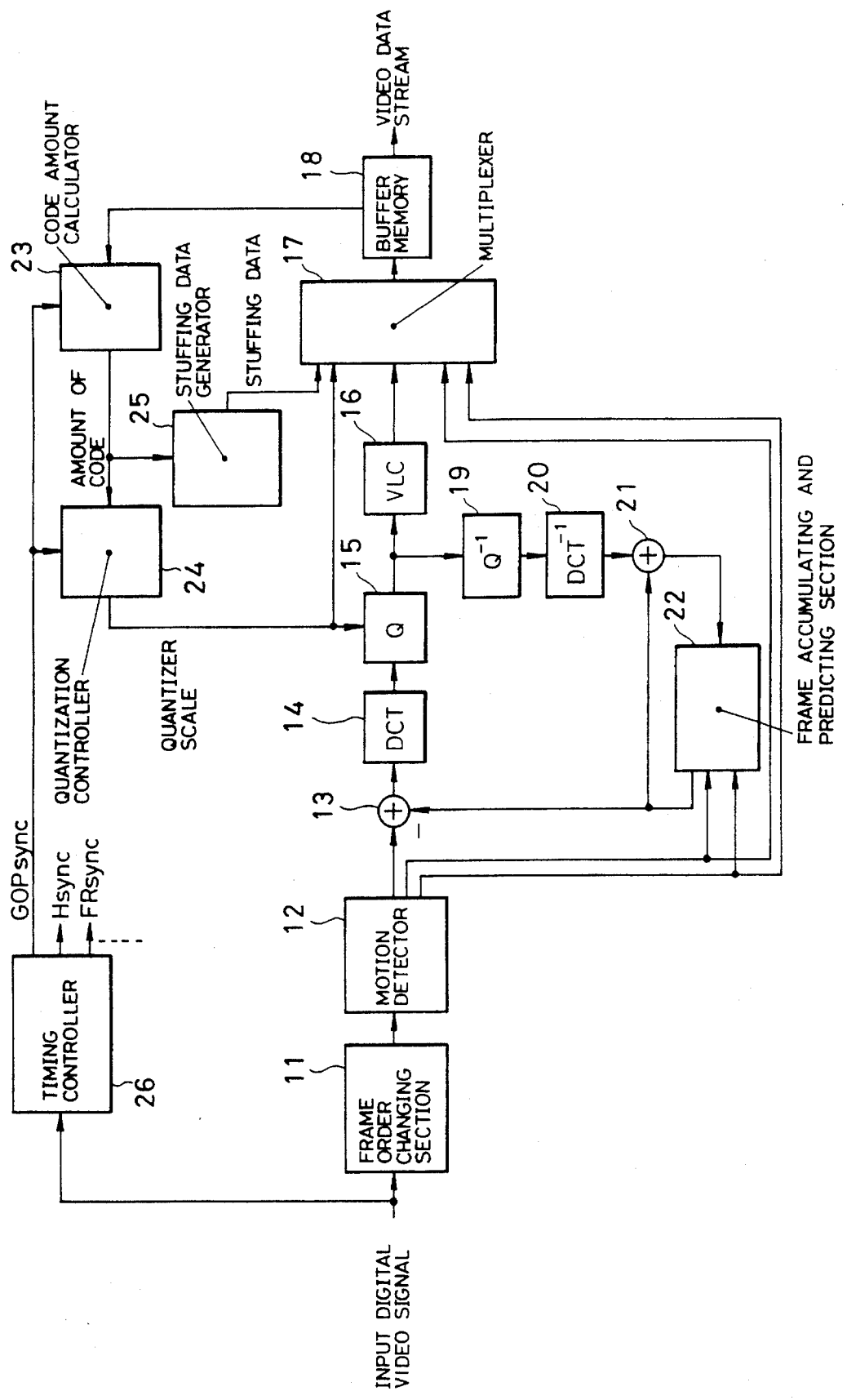
FIG. 6 is a schematic block diagram of an encoder which accomplishes a method of making the amount of data of GOP (Group Of Pictures) constant and which is employed in one embodiment of the present invention.

FIG. 6 presents a schematic block diagram of an encoder which accomplishes this method.

In FIG. 6, the encoder comprises a frame order changing section 11, a motion detector 12, a differentiator 13, a discrete cosine transformer (DCT) 14, a quantizer 15, a variable length coder (VLC) 16, a multiplexer 17, a buffer memory 18, an inverse quantizer 19, an inverse DCT 20, an adder 21 and a frame accumulating and predicting section 22. The predicting section 22 detects the moving vector, and determines the prediction mode. The inverse DCT 20, inverse quantizer 19 and adder 21 constitute a local decoder.

The basic function of this encoder is to perform discrete cosine transformation (DCT) of an input digital video signal by the DCT 14, quantize the transformed coefficient by the quantizer 15, encode the quantized value by the VLC 16 and output the coded data as a video stream via the buffer memory 18. The DCT, quantization and coding are carried out in accordance with the detection of the moving vector, the discrimination of the prediction mode, etc., which are accomplished by the local decoder, the predicting section 22 and the motion detector 12.

While the basic structure and function of this encoder are described in the specifications of the aforementioned ISO 11172, the block which makes the amount of data in one GOP in the output video stream will be discussed in the following description.

This block comprises a code amount calculator 23, a quantization controller 24, a stuffing data generator 25, and a timing controller 26. The code amount calculator 23 attains the amount of stored data occupying the buffer memory 18 and calculates the amount of accumulated data of video signals, coded at the input section of the buffer memory 18, (amount of codes) from the head of the GOP. The quantization controller 24 determines the quantizer scale for each predetermined unit obtained by dividing one frame by a predetermined size in accordance with the amount of the stored data and the amount of accumulated data, and controls the amount of coded data. The stuffing data generator 25 generates predetermined stuffing data in accordance with the amount of accumulated data. The timing controller 26 generates timing signals necessary for the individual sections, such as a horizontal sync signal Hsync, a frame sync signal FRsync and a GOP sync signal GOP sync, based on the input digital video signal. The quantizer 15 quantizes the coefficient after DCT, divides this value by the quantizer scale obtained by the quantization controller 24, and then outputs the resultant value. The quantizer scale becomes an input to the multiplexer 17. The output of the stuffing data generator 25, which will be discussed later, is also one input to the multiplexer 17.

Figure 7:
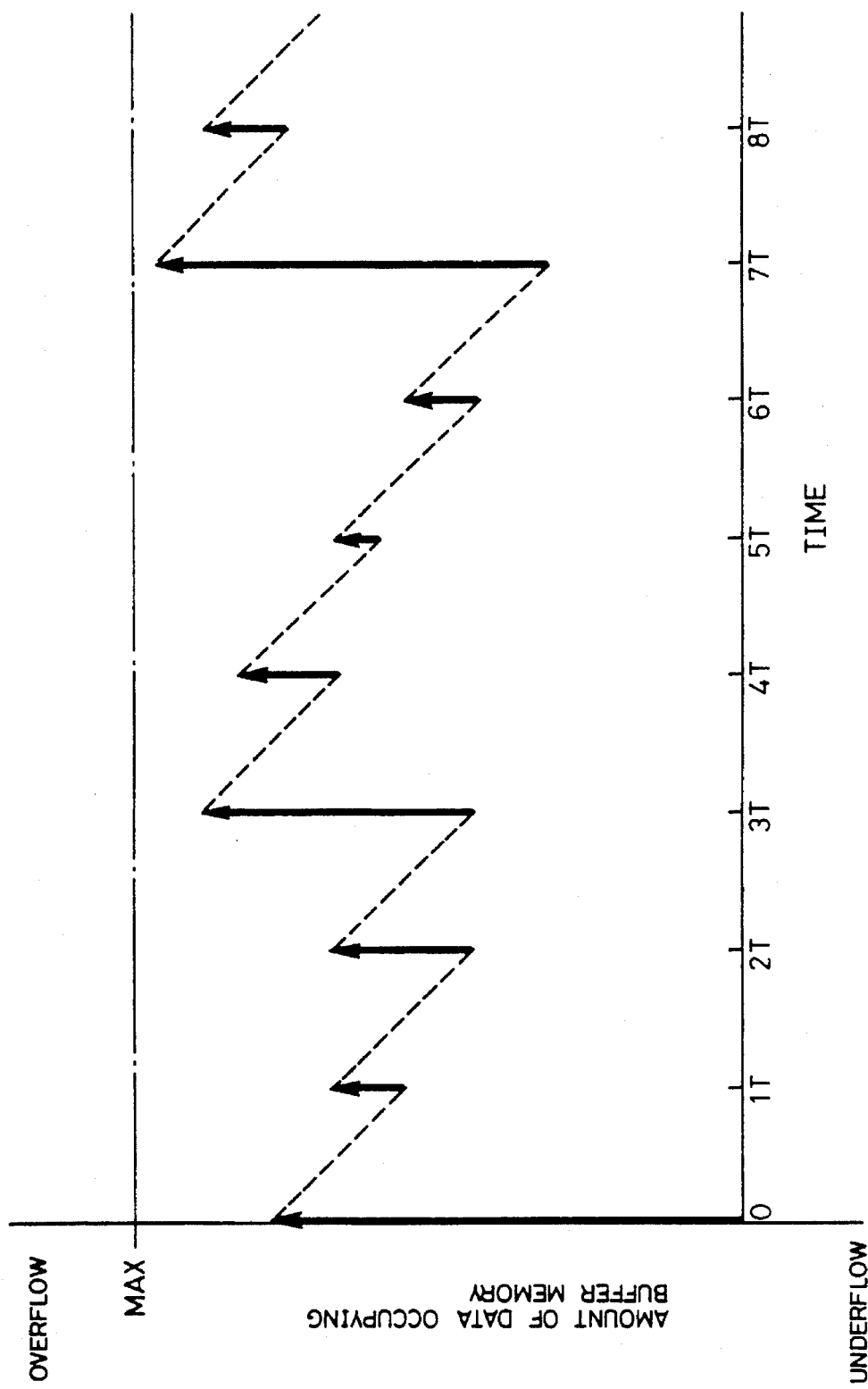
FIG. 7 is a time chart for explaining the operation of a buffer memory of the encoder shown in FIG. 6.

The buffer memory 18 functions as illustrated in FIG. 7. A variable amount of coded data is generated and written in the buffer 18 at times 0, 1T, 2T and so forth (T: frame period). In this diagram, the arrows and their lengths respectively represent the writing directions and the amount of data in the memory 18. The data is read out from the buffer memory 18 at a constant rate. This is represented by the inclined, broken lines in the diagram. The writing and reading are repeated in the illustrated manner. The code amount calculator 23 obtains the amount of data occupying the buffer memory 18, and the quantization controller 24 alters the quantizer scale of the quantizer 15 based on the amount of occupying data in such a way that the buffer memory 18 does not overflow or underflow. Thus the amount of data to be input to the buffer memory 18 can be controlled. As the quantizer scale of the quantizer 15 increases, the amount of output data therefrom decreases. As the quantizer scale decreases, on the other hand, the amount of output data from the quantizer 15 increases. The image quality is however reciprocal to the quantizer scale. This control on the amount of codes is also described in the specifications of the ISO 11172 as a method of transferring, at a constant rate, a variable amount of coded data generated frame by frame.

As the amount of data in each GOP is constant in this embodiment, the following control is carried out in addition to the above-described control on the amount of data.

The value of the quantizer scale may be determined as follows.

In order to make the amount of data in one GOP constant, the quantization controller 24 calculates the amount of accumulated data from the head block of the GOP immediately before that block (expected amount of accumulated data) based on the amount of data set previously block by block. The quantization controller 24 obtains the difference between this expected amount of accumulated data and the amount of data obtained by the code amount calculator 23 or the amount of accumulated data actually coded and generated from the head block of the GOP immediately before that block (actual amount of accumulated data). Then, the quantization controller 24 determines the value of the quantizer scale so that the actual amount of accumulated data approaches as closely as possible to (but does not exceed) the expected amount of accumulated data in accordance with the difference between the expected amount of accumulated data and the amount of data obtained by the code amount calculator 23 or the actual amount of accumulated data. The top of each GOP is indicated by the GOP sync signal GOP sync from the timing controller 26.

The amount of data for each block may be set in the following manner.

(1) The ratio of the amounts of data of I, P and B pictures for each frame is determined.

For example, I:P:B=15:5:1.

(2) The amount of data of each frame determined by the ratio given in the above process (1) is evenly allocated to the individual blocks in one frame.

When coding of all the frames of one GOP is finished, the actual amount of accumulated data is equal to or smaller than the expected amount of accumulated data. To completely match the expected amount of accumulated data with the amount of data in the video data stream in one GOP period, stuffing data (e.g., dummy data consisting of all "0") generated by the stuffing data generator 25 is added to the actual accumulated data in the video data stream in one GOP period.

In the coding system which conforms to the ISO 11172, a bit stream has a plurality of positions where a proper amount of stuffing bits having a predetermined bit pattern can be inserted, and the bit stream is defined so that the presence of stuffing bits and the length thereof can be discriminated. For example, a stream of MB STUFF (macroblock stuffing) data of a macroblock layer or the like is used. Further, the quantizer scale is also defined to be inserted in the bit stream when it is transmitted. For example, a stream of QS (quantizer scale) of a slice layer is used.

The decoder, which decodes a video data stream that includes the stuffing data and quantizer scale and has a constant amount of GOP data, detects various headers inserted in the input bit stream (such as the sequence header, GOP start code, picture start code and slice start code) and is synchronized with this bit stream. The decoder performs decoding of each block in the bit stream by referring to the quantizer scale and performs no decoding on stuffing data when detected (i.e.,) the stuffing data is not decoded as video or audio signals or other information. In other words, the decoder disregards the stuffing data and can thus perform decoding without particularly executing the above-described data amount control to make the amount of data in each GOP constant.

The essential features of the present invention will now be described with reference to FIGS. 8 through 10.

Figure 8:
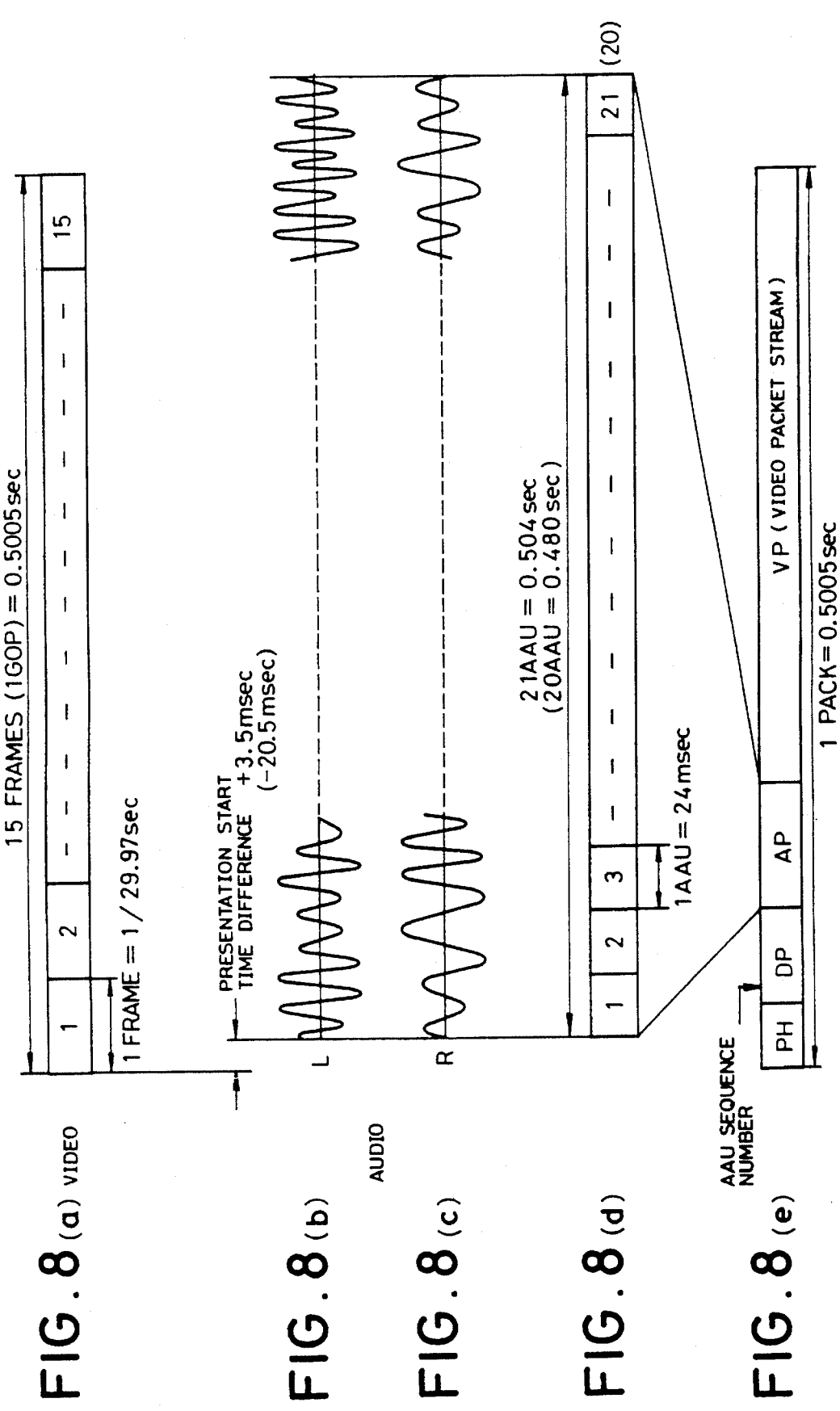
FIG. 8 is a diagram showing the format of a pack in a transmission method according to one embodiment of the present invention and the time-sequential relation between actual video information and audio information in that pack.

FIG. 8 is a diagram showing the format of a pack in a transmission method according to one embodiment of the present invention and the time-sequential relation between actual video information and audio information in that pack.

As shown in (a) in FIG. 8, one GOP, (i.e., 15 frames of video information stored, in a video packet VP of such a pack, can be considered as having a time slot of 0.5005 sec as one frame has a time slot of $1/29.97$ sec. Thus, the time slot of a pack is set equal to the time slot of the video packet VP (i.e., 0.5005 sec).

According to the system that conforms to the ISO 11172, 1152 samples of two (R and L) channels of audio signals as shown in (b) and (c) in FIG. 8 are treated as one AAU (Audio Access Unit), and are compressed to data having a fixed length for each AAU. Given that the sampling frequency of audio signals is 48 KHz, 1152 samples have a time slot of 24 msec which is the time slot of a single AAU as shown in (d) in this diagram. Therefore, the number of AAUs to be stored in one pack having a time slot of 0.5005 sec is equivalent to 20.854···.

Since decoding of audio signals is performed for each AAU, the number of AAUs in one pack is "21" or "20" if that number is an integer. If twenty-one AAUs are to be stored in one pack, audio information lags by 3.5 msec from video information per one pack, and if twenty AAUs are to be stored in one pack, audio information leads 20.5 msec from video information per one pack, as shown in (b), (c) and (d) in FIG. 8. Accordingly, forty-one packs each containing 21 AAUs and seven packs each containing 20 AAUs, mounting to forty-eight packs having just 1001 AAUs, coincide with the time slot of 48 packs 24.024 sec. The relative time difference between a video packet VP and an audio packet AP in one pack therefore differs from one pack to another and returns to the original one in a period of 48 packs. (Hereinafter, this period will be called "48-pack period.")

To absorb this time difference, an AAU sequence number is inserted in a data packet DP in each pack as information indicating the location of that pack in a stream of 48 packs which form one period.

FIG. 9 exemplifies the relation among this AAU sequence number, the number of AAUs in one pack, and the difference between presentation start times for video signals and audio signals in a reproducing apparatus.

It is apparent from FIG. 9 that AAU sequence numbers "0" to "47" are given to identify packs numbered from "1" to "48" in one 48-pack period, and AAU sequence numbers "0" to "47" are also given to identify subsequent packs in the next 48-pack period starting from the one with a pack number "49". It is also apparent that a pack having 20 AAUs is formed in nearly a 7-pack period and every time this pack is input to the reproducing apparatus, the difference between the presentation start times for video signals and audio signals becomes smaller. At the last pack in the 48-pack period having an AAU sequence number "47", this difference becomes zero.

A description will now be given of the reproducing apparatus that reproduces video and audio signals and data, which are transmitted in such a stream of packs.

Figure 10:
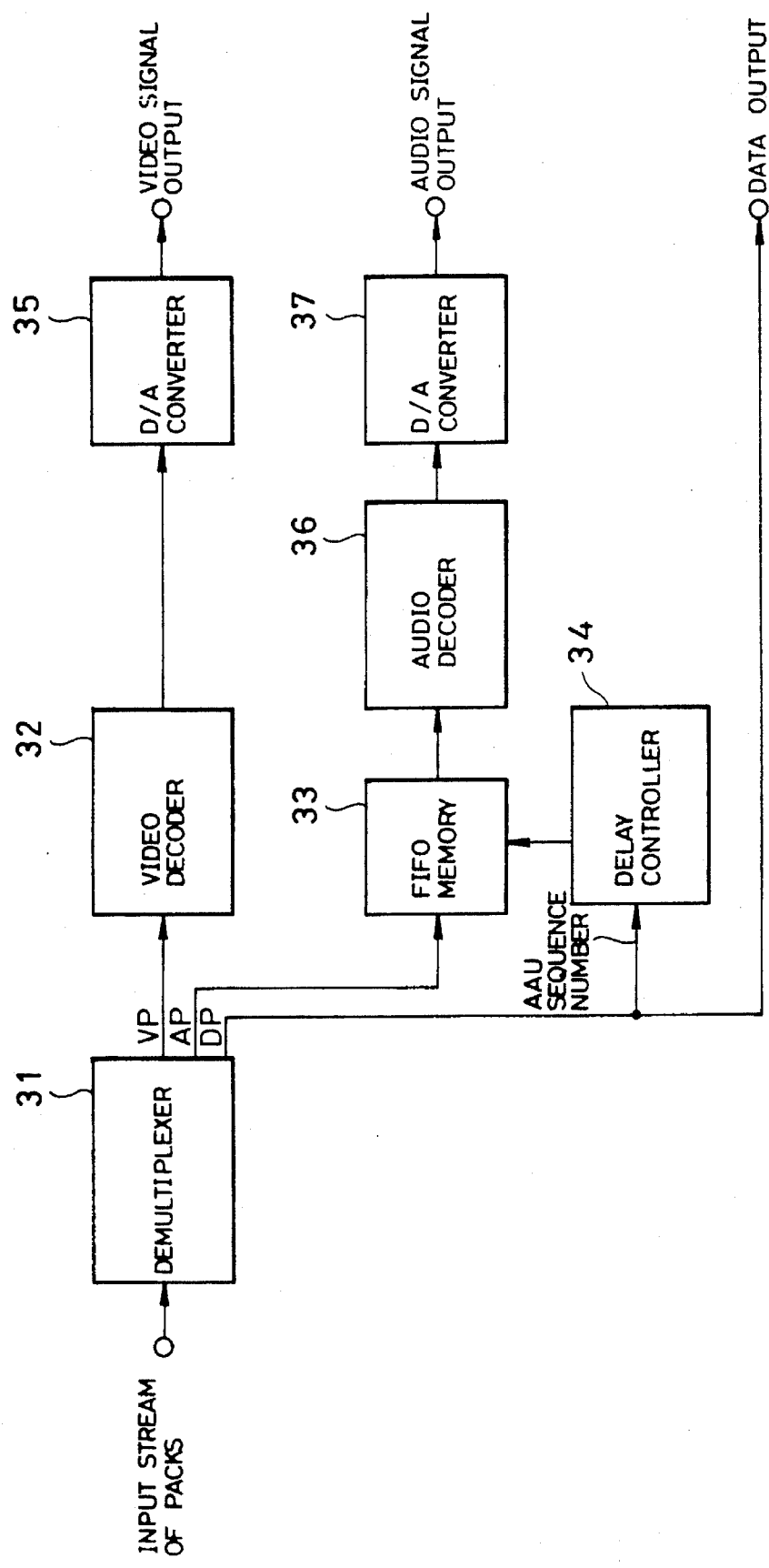
FIG. 10 is a block diagram of a reproducing apparatus which accomplishes a reproducing method according another embodiment of the present invention.

FIG. 10 is a block diagram of this reproducing apparatus.

In FIG. 10, a demultiplexer 31 separates an input stream of packs into a stream of video packets, a stream of audio packets and a stream of data packets. The separated video packet VP is sent to a video decoder 32, the separated audio packet AP is sent to an FIFO (First-In First-Out) memory 33, and the separated data packet DP is sent to a delay controller 34. The data packet DP is also output directly as a data output. The video decoder 32 decodes compressed video signals and outputs the decoded video signals to a D/A converter 35. The D/A converter 35 converts the decoded video signals to analog video signals and outputs them as a video signal output. The FIFO memory 33 functions as a variable delay circuit whose delay amount is controlled by the delay controller 34, and outputs delayed audio packet data to an audio decoder 36. The audio decoder 36 decodes the compressed audio signals and sends the resultant signals to a D/A converter 37. The D/A converter 37 converts the decoded audio signals to analog audio signals and outputs them as an audio signal output.

The delay controller 34 refers to the AAU sequence number in the data packet DP to acquire the difference between presentation start times for the video output and the audio output, and controls the delay amount of the FIFO memory 33 so that this delay amount matches with the acquired time difference. Accordingly, the synchronous reproduction of the video signals and audio signals is achieved.

As described above, the difference between the presentation start times for the video signals and audio signals included in a pack cyclically varies in a period of a certain number of packs, each pack includes information on the number of that pack in a plurality of packs that constitutes one period, the difference between the presentation start times for the video signals and audio signals in each pack is acquired by referring to this information on the pack number, and the decoding timing is controlled based on this time difference. The synchronous reproduction of the video signals and audio signals can therefore be accomplished easily.

As synchronous reproduction requires just 48 delay patterns for the FIFO memory 33, the circuit structure becomes simple. Another advantage is that the buffer (FIFO memory 33 in this case) for controlling the timing of audio signals can have a small capacity. To match the time axis of video signals with the time axis of audio signals, it is possible to control the time axis of video signals alone or control both time axes of video and audio signals.

The FIFO memory 33 as a variable delay circuit may be positioned at the subsequent stage of the audio decoder 36 or the buffer memory in the audio decoder 36 may also be used as a variable delay circuit.

Although one pack contains single data, audio and video packets in the above-described embodiment, one pack may contain a plurality of packets for each type. Although two channels of audio signals are processed, four channels of audio signals may be dealt with. In the case of four channels, audio signals should be compressed, AAU by AAU, by the same time, two channels at a time, before the audio signals are stored in a packet. The same applies to the case of multichannel of audio signals. Although the foregoing description of the embodiment has been given with reference to the case where video signals are compressed before transmission, the present invention is also applicable to the case where video signals are transmitted uncompressed.

Further, although the embodiment has been explained as the system which also has a function of recording a stream of packs on a recording medium, the advantages of the present invention can be expected as long as the system, even without the recording function, has a function of transmitting time-divided video and audio signals.

In short, according to the method of transmitting time-divided video and audio signals, the number of unit audio data blocks to be put in one pack is set in such a way that the difference between the presentation start times for the stream of video data and the stream of audio data in one pack in a predetermined pack period becomes a predetermined value, and the pack carries positional information of the pack in the predetermined pack period to the pack. In addition, according to the method of reproducing time-divided video and audio signals, the difference between presentation start times for video signals and audio signals in each pack is acquired by referring to positional information in a stream of packs, transferred by the above transmission method, and at least one of the presentation start times for video signals and audio signals in the stream of packs is controlled so that the difference between the presentation start times coincides with the difference between the presentation start times corresponding to the positional information.

With the above design, it is possible to provide a synchronizing system with a simple structure, which can accomplish synchronous reproduction without complicating the control circuit for synchronizing video and audio signals with each other.

What is claimed is:

1. A method of transmitting time-divided video and audio signals, comprising the steps of:

coding a video time slot of video signals to form a stream of video data, wherein said video time slot has a predetermined duration;

coding a predetermined number of samples of audio signals to form a unit audio data block and forming a stream of audio data comprising a number of unit audio data blocks; wherein a duration of an audio time slot of said number of unit audio data blocks approximately corresponds to said predetermined duration of said video time slot;

performing time-division multiplexing on said stream of video data and said stream of audio data, storing resultant data in a pack having a pack time slot with a duration substantially equal to said predetermined duration of said video time slot, and transferring said video signals and said audio signals in a stream of packs; and setting said number of unit audio blocks in such a way that a difference between presentation start times for said stream of video data and said stream of audio data in one pack in a predetermined pack period becomes a predetermined value, and affixing positional information of said one pack in said predetermined pack period to said one pack.

2. The method according to claim 1, wherein said predetermined pack period is a period of 48 packs.

3. The method according to claim 1, wherein said positional information indicates a number of said one pack in said predetermined pack period.

4. The method according to claim 2, wherein said positional information indicates a number of said one pack in said predetermined pack period.

5. A method of reproducing time-divided video and audio signals, comprising the steps of:

referring to positional information of a stream of packs;

controlling at least one of a plurality of presentation start times for video signals and audio signals in said stream of packs in such a manner that a difference between said plurality of presentation start times for said video signals and audio signals coincides with a difference between presentation start times corresponding to said positional information, wherein said stream of packs is transferred by a method of transmitting time-divided video and audio signals, comprising the steps of:

coding a video time slot of video signals to form a stream of video data, wherein said video time slot has a predetermined duration;

coding a predetermined number of samples of audio signals to form a unit audio data block and forming a stream of audio data comprising a number of unit audio data blocks, wherein a duration of an audio time slot of said number of unit audio data blocks approximately corresponds to said predetermined duration of said video time slot;

performing time-division multiplexing on said stream of video data and said stream of audio data, storing resultant data in a pack having a pack time slot with a duration substantially equal to said predetermined duration of said video time slot, and transferring said video signals and said audio signals in a stream of packs; and setting said number of unit audio blocks in such a way that a difference between presentation start times for said stream of video data and said stream of audio data in one pack in a predetermined pack period becomes a predetermined value, and affixing positional information of said one pack in said predetermined pack period to said one pack.

6. The method according to claim 5, wherein said predetermined pack period is a period of 48 packs.

7. The method according to claim 5, wherein said positional information indicates a number of said one pack in said predetermined pack period.

8. The method according to claim 6, wherein said positional information indicates a number of said one pack in said predetermined pack period.

9. A method of reproducing time-divided video and audio signals, comprising the steps of:

referring to positional information of a stream of packs;

controlling at least one of a plurality of presentation start times for video signals and audio signals in said stream of packs in such a manner that a difference between said plurality of presentation start times for said video signals and audio signals coincides with a difference between presentation start times corresponding to said positional information, wherein said positional information indicates a number of at least one pack of said stream of packs in a predetermined pack period.

10. The method according to claim 9, wherein said predetermined pack period is a period of 48 packs.

* * * * *